No. 775,043. Patented November 15, 1904.

UNITED STATES PATENT OFFICE.

THOMAS J. LOVETT, OF CHICAGO, ILLINOIS.

PROCESS OF RECOVERING GOLD AND OXID OF IRON FROM SAND.

SPECIFICATION forming part of Letters Patent No. 775,043, dated November 15, 1904.

Application filed September 24, 1904. Serial No. 225,793. (No specimens.)

*To all whom it may concern:*

Be it known that I, THOMAS J. LOVETT, a citizen of the United States, residing at Chicago, in the county of Cook and State of Illinois, have invented a new and useful Improvement in Processes of Recovering Gold and Oxid of Iron from Sand, of which the following is a specification.

My invention relates to an improved method of treating certain alluvial deposits containing magnetic oxid of iron and free gold for the purpose of recovering both of these metals. The deposits referred to consist for the most part of sand containing a more or less large percentage of magnetic iron oxid in a granular or pulverulent state with which fine particles of free gold are associated or to which they adhere in a manner which renders mechanical or hydraulic separation impracticable. The sand as a rule also contains some free gold unassociated with the oxid of iron. Efforts have been made hitherto to work these sand deposits by sluicing or otherwise to recover the free gold not associated with the iron oxid; but the presence of the latter has hitherto been a detriment, because it tended to clog the riffles or the like, making it difficult to catch the free gold particles. So far as I am aware no attempt has been made to recover the gold adhering to or associated with the oxid of iron. Therefore not only has the iron constituent of the sand been wasted with the tailings, but also the gold adhering to or associated with the iron. Furthermore, the presence of the iron oxid has stood in the way of recovering a large percentage of the gold not adhering to or associated with the iron.

The primary object of my invention is to solve the problem of readily recovering from sands of the class mentioned not only the free gold, which is unassociated with the iron oxid, but also the gold carried by the iron oxid particles.

It is also my object not only to solve the problem of thus saving all, or nearly all, the gold contained in the mass of sand, but also to recover and render marketable the oxid-of-iron particles, which, freed from silicon and other constituents of the sand, run as high in many cases as seventy per cent. pure iron. The iron oxid will thus be very valuable either for smelting by itself or for raising the grade of inferior iron ores when mixed therewith.

In carrying out my invention the sand containing the oxid of iron and free gold is mined by means of a land or water dredge, by means of a sand-sucker, by hydraulic means, or in any other suitable way that may be found most convenient or economical. The sand as it is mined and mixed with water to flow freely is subjected to magnetic separation to extract from the mass the magnetic iron oxid with the gold adhering thereto or associated therewith. A wet separation is necessary for economy's sake, dry separation in very large quantities being practically out of the question. The wet separation is accomplished by passing the sand in a continuous stream, preferably as it is mined, through a waterproof magnetic separator, which operates to draw the magnetic iron oxid out of the mass in a comparatively clean state, rendering the saving thereof easy and inexpensive. If approximately all the gold values are associated with or adhere to the magnetic iron oxid, the tailings from the magnetic separator may be discarded. If, however, the said tailings contain free gold to any material extent, they may be caused to flow from the magnetic separator through sluice-boxes or other appliances, which will separate and save the gold contents. The magnetic iron oxid, separated as described and carrying gold, is then subjected to suitable lixiviation, preferably by leaching it with cyanid of potassium. Cyaniding this concentrated mass dissolves out the gold without causing material, if any, injury to the iron. The gold solution may be treated in any suitable manner, well known or otherwise, for recovering the bullion. I have devised and constructed an electromagnetic separator that is capable of operating upon several hundred tons of the sand each day to separate therefrom the magnetic iron oxid substantially free from silicon. Therefore the tailings from the leaching-vats will be substantially pure magnetic oxid of iron, which may be dried, if desired, and shipped in a granular state to the furnace, or it may be briqueted for smelting. The concentrated oxid of iron in a granular or pulverulent state is in the best condition for electric smelting.

In certain localities the alluvial deposits contain not only a more or less large percentage of magnetic iron oxid with which gold is associated, but also a material percentage of non-magnetic iron oxid also having gold associated therewith. The non-magnetic oxid of iron particles would not be withdrawn from the mass by the magnetic separator and would therefore escape from the separator with the tailings. These non-magnetic iron particles, however, may be caught in sluice-boxes or the like, and if in sufficient quantity to render lixiviation thereof profitable they, with all the free gold caught by the riffles, may be cyanided in the same way as the magnetic oxid of iron.

My invention is in the nature of a compound process—that is to say, it consists of several processes, which being performed in proper order produce the result aimed at—and I do not claim as my invention any particular single step thereof, but merely the process or method as a whole. All the steps of my improved method would be useful only for the purpose of recovering gold and iron from more or less finely-divided silicious material, such as sand, containing magnetic iron oxid to which free gold particles adhere or by which they are held. Such ore has never been treated in the manner described and for the purpose set forth, and, so far as I am aware, concentrated iron oxids and free gold have never before been treated to recover both metals and leave the iron in merchantable condition.

What I claim as new, and desire to secure by Letters Patent, is—

1. The process of obtaining the values from concentrated gold-bearing iron oxids in a finely-divided condition, which consists in subjecting the iron oxids to the lixiviating action of a suitable chemical solution capable of dissolving the gold without materially injuring the iron, separating the iron and solution, then recovering the gold from the solution.

2. The process of recovering free gold from sand containing magnetic oxid of iron carrying free gold particles which consists in magnetically separating said oxid of iron with the gold carried thereby from the sand, then subjecting the oxid of iron and gold concentrates thus obtained to the lixiviating action of a suitable chemical solution capable of dissolving the gold without material injury to the iron, separating the solution from the iron, saving the iron, then recovering the gold from the solution.

3. The process of recovering free gold and oxid of iron from sand containing magnetic iron oxids with which gold is incorporated, which consists in subjecting the mass mixed with water in a fluid state to magnetic separation to separate and concentrate the magnetic oxid of iron with the gold carried thereby, concentrating by means of water the tailings from the magnetic separator to separate any remaining oxid of iron and gold therefrom, then subjecting all the iron and gold concentrates to the lixiviating action of a suitable chemical solution capable of dissolving the gold without material injury to the iron, separating the iron and solution to leave the iron in merchantable condition and finally recovering the gold from the solution.

THOMAS J. LOVETT.

In presence of—
WALTER N. WINBERG,
F. M. WIRTZ.